Nov. 20, 1923.  1,474,870
E. WESSALE
APPARATUS FOR PREPARING CANE FOR EXTRACTION
Original Filed Aug. 16, 1920  4 Sheets-Sheet 1

Nov. 20, 1923.  1,474,870
E. WESSALE
APPARATUS FOR PREPARING CANE FOR EXTRACTION
Original Filed Aug. 16, 1920   4 Sheets-Sheet 2

INVENTOR
EDWARD WESSALE
By Paul & Paul
Attorneys

Nov. 20, 1923. 1,474,870

E. WESSALE

APPARATUS FOR PREPARING CANE FOR EXTRACTION

Original Filed Aug. 16, 1920 4 Sheets-Sheet 3

INVENTOR
EDWARD WESSALE
By Paul & Paul
Attorneys

Nov. 20, 1923.
E. WESSALE
1,474,870
APPARATUS FOR PREPARING CANE FOR EXTRACTION
Original Filed Aug. 16, 1920  4 Sheets-Sheet 4

INVENTOR
EDWARD WESSALE
By Paul & Paul
ATTORNEYS

Patented Nov. 20, 1923.

1,474,870

UNITED STATES PATENT OFFICE.

EDWARD WESSALE, OF WACONIA, MINNESOTA.

APPARATUS FOR PREPARING CANE FOR EXTRACTION.

Original application filed August 16, 1920, Serial No. 403,996. Divided and this application filed February 17, 1922. Serial No. 537,262.

*To all whom it may concern:*

Be it known that I, EDWARD WESSALE, a citizen of the United States, resident of Waconia, county of Carver, State of Minnesota, have invented certain new and useful Improvements in Apparatus for Preparing Cane for Extraction, of which the following is a specification.

This invention relates to apparatus employed in the manufacture of sirups and sugar from sorghum and sugar cane. It includes apparatus employed in preparing cane for the milling process, known as the extraction, by removing the tops, leaves, sheaths, trash, pebbles, dirt, metal objects, etc., from the harvested cane prior to extracting the juices and sugar therefrom. The cane is mechanically passed under cutters of novel design to remove the tops, then the cane is automatically conveyed to a cutting mechanism whereat it is cut into sections to sever the leaves and sheaths, etc., from the cane and to reduce trash, which is among the cane material, to short lengths or sections and thereafter the apparatus automatically discharges the sectional cane. This unitary apparatus thus comprises a top-removing mechanism, a conveyer, a stalk-cutting mechanism, and the discharging means. These mechanisms are automatically co-operable successively to treat the cane fed thereto.

For a good grade of sorghum sirup all leaves and seed heads or tops must be removed from the cane, as these passing on through the mill tend to impart a bad flavor to the juice and resulting sirup, introduce more or less dirt and fine particles of plant material into the juice, and retard clarification. Moreover, leaves which have become dry have a tendency to absorb juice as it is pressed out in the mill, thus decreasing the yield of juice and sirup.

Sorghum and sugar cane bear much foliage in the form of leaves and sheaths and also seed-heads known as tops. All these together with suckers and some weeds contain many impurities and must be removed completely before subjecting them to the usual milling to extract the juices as these impurities pollute the juices. Therefore in current practice in the effort to reduce this disadvantage of getting impurities into the juices, it is usual manually to remove the tops, leaves, sheaths, and trash (suckers and weeds) before or during the harvesting operation of the cane, leaving the stalk its original length. This is a very expensive and tedious operation and at best the work is not effectively done. As a practical matter, the sheaths especially on sorghum are seldom removed at all.

It has been found that the tops, leaves, sheaths and trash can be much more effectively and less laboriously removed at the sirup or sugar factory by a preparatory or cleaning process prior to feeding the stalks to the cane mills. Through the employment of this novel apparatus the sugar or sorghum cane can be harvested in the field either with a corn binder or by hand without any preparatory work. By passing the harvested cane through a top-removing element, the tops are removed. Then, by cutting the stalks and remaining trash, leaves and sheaths into sections, the whole is converted into a loose mass of short sections of stalks, leaves, etc., in which the leaves as well as sheaths and trash are detached from the stalks. The stalk sections may then easily be separated from the waste sheath and trash material preparatory to the extraction.

The object of the invention is to provide an improved apparatus for preparing cane for extraction.

Other objects of the invention will more fully appear from the following description and the accompanying drawings and will be pointed out in the annexed claims.

In the accompanying drawings, there has been disclosed a structure designed to carry out the objects of the invention, but it is to be understood that the invention is not confined to the exact features shown, as various changes may be made within the scope of the claims which follow.

Figure 1:
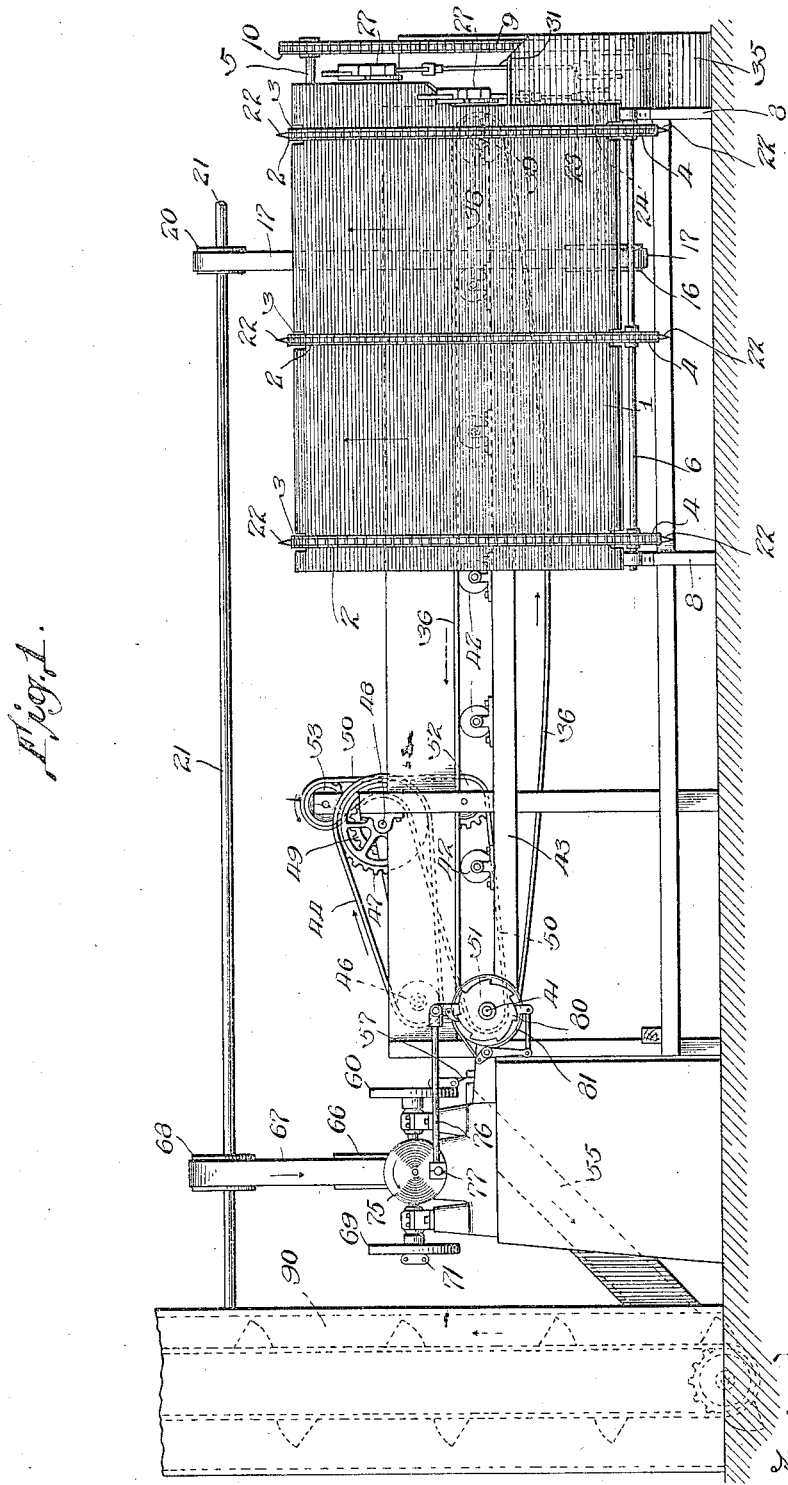
Figure 1 is a side elevation of the apparatus.
Figure 2:
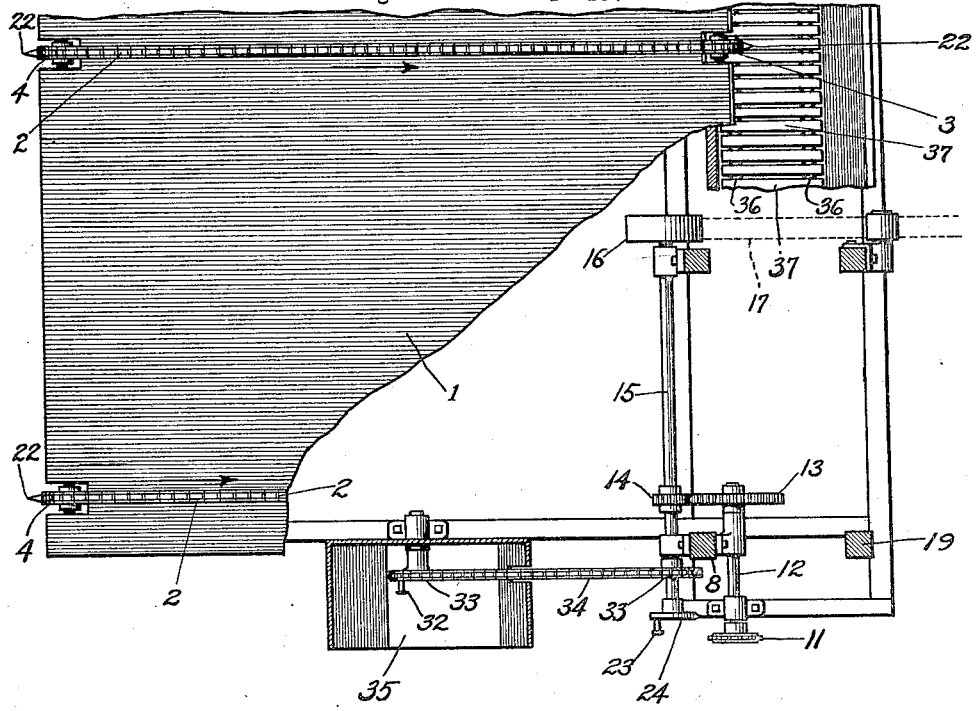
Figure 2 is a view partially in plan and partially in section on the line 2—2 of Figure 3.

The selected embodiment of the novel apparatus here shown is a portion of that disclosed in the prior pending application of the inventor hereof, Serial Number 403,996, filed August 16, 1920, of which this application is divisional.

The cane, as received from the field, is first treated by the top-removing mechanism. The cane is deposited upon the inclined platform 1. Such platform is preferably stationary and means are provided for causing the harvested cane to travel thereover. Such means are here shown as a plurality of endless chains 2. Each of these chains travels over upper sprocket wheels 3 and lower sprocket wheels 4. The three upper sprocket wheels 3 are each fast upon a shaft 5 while the lower sprocket wheels 4 are similarly mounted upon a shaft 6 rotatably borne in bearings provided by the brackets 7. The platform and brackets are suitably supported as by standards 8. The upper sprocket shaft 5 is actuated by a chain 9 engaging a sprocket 10 fast upon the shaft 5. The chain 9 is driven by a sprocket 11 fast upon a stub shaft 12 which bears a gear 13 in mesh with a pinion 14 upon the counter-shaft 15. The counter-shaft 15 has also fast thereon a pulley 16 engaged by a bolt 17 running over idlers 18 borne by the leg 19 of the adjacent conveyer frame. The belt 17 is in turn driven by a pulley 20 fast upon the main driven power or line-shaft 21. This line-shaft 21 is actuated by a suitable power means not necessary here to be shown.

The three chains 2 are provided with studs 22 which upwardly project at spaced intervals from the chains. The function of the studs 22 is to engage and upwardly carry the harvested cane over the platform 1.

The harvested cane is first placed upon the platform 1 so as to be conveyed upwardly by the studs 22 of the chains 2. The seed-heads or tops are manually arranged so that the cane portion adjacent the tops may be severed from the remainder of the cane. This severance is effected in this mechanism by the means of the triangular shaped knife 25. Two similar and rearwardly spaced severing devices are here shown. The purpose of employing two such severing devices is to permit an operative to re-arrange any cane which was not topped by the first knife due to any negligence in initial arrangement of the cane upon the chains 2. These two severing devices are alike and but one will be necessary to be described. The knife 25 is mounted upon a bar 26 which is reciprocally slidable in a bracket 27 carried by the frame 28 of the platform. An upper stationary blade 29 and a lower stationary blade 30 downwardly project from the brackets 27 in spaced relation. The space between the divergent opposed edges of the stationary blades is sufficient to permit entry of the cane to be topped. The knife 25 is adjacent the inner face of the two stationary blades and co-operates therewith in its reciprocating movement to sever the tops from the cane. The knife 25 is actuated in timed relation to the movement of the cane by the chains so that upon successive raisings of the knife 25, successive amounts of the top end portions of the cane enter between the stationary blades and are successively severed by the downward strokes. In practical operation, the chains preferably travel between twenty and forty feet per minute and the knife strokes are accordingly timed. Each reciprocating bar 26 of each knife 25 is provided with a rod 31 pivotally secured thereto and the lower end of each rod 31 is pivotally borne by an eccentrically mounted pin 32. The two severing devices are slightly transversely offset. Hence, while the eccentric pin 32 of the lower knife rod is borne by a sprocket 33, the eccentric pin 23 of the upper knife rod is borne by a disk 24 fast on the shaft 15 which also has fast thereon another sprocket 33.

Each of the two sprockets 33 is suitably journaled on the platform frame and the forward sprocket is driven by means of the chain 34 which is carried by the rear sprocket 33 fast upon the previously mentioned counter-shaft 15. The seed-heads or tops, upon removal, drop into a hopper 35 from which they may be subsequently removed for seeding, feeding or fuel purposes.

The cane, after top-removal, is next presented to the cutting means which functions to cut the cane into relatively short sections. As this novel apparatus is at present employed the cane is cut into sections about four and one-half inches to five inches in length. This particular apparatus is adjusted to treat sorghum cane in which the free leaf is about twenty-four inches while the sheath closely adjacent the stalk is about ten inches. Hence, when the cane is cut into four and one-half inch sections, the maximum sheath portion remaining on the stalk is only four and one-half inches while the whole leaf and a portion of the sheath is separated therefrom.

Figure 3:
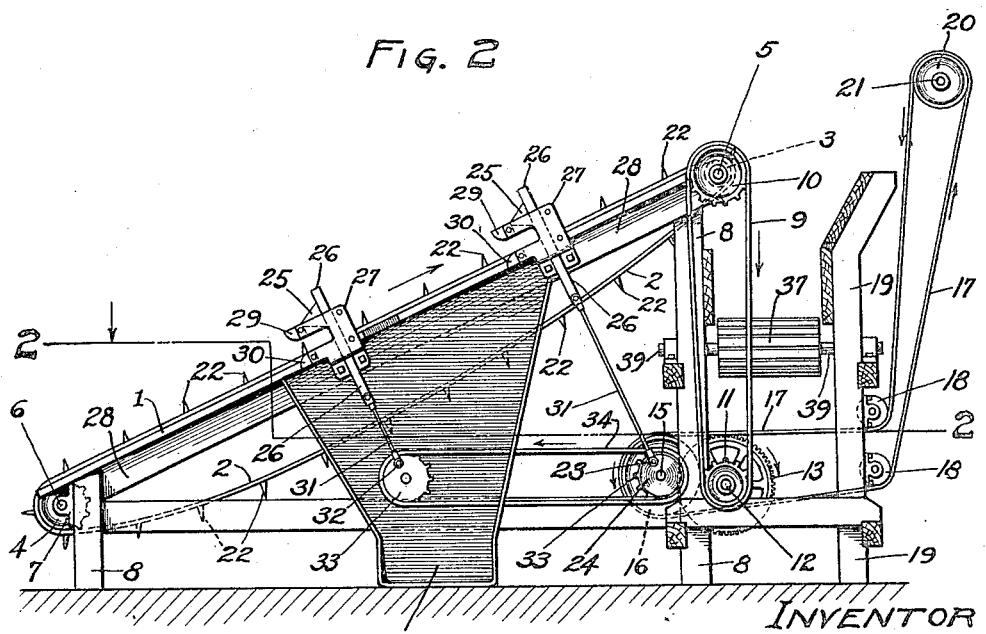
Figure 3 is a side elevation of the top-removing mechanism and an end view of the associated conveyor.

A conveyer is positioned below the level of the upper terminal edge of the platform 1 automatically to receive the topped cane as it is carried over the edge and dropped therefrom. This conveyer preferably consists of two opposed endless chains 36 to which are transversely secured a plurality of cleats or bars 37 in closely spaced relation to form an endless apron to convey the cane thereon. As the topped cane drops upon this traveling apron, the cane is presented to the cutting means with the bottom or butt end first. Rearwardly, adjacent the top-remover, the apron chains 36 engage opposed idler sprockets 38 fast on a stud shaft 39 rotatably borne by the standard 8 and the leg 19 (see Figure 3). Forwardly, the chains 36 engage and are driven by two similar opposed sprockets 40 which are keyed to a shaft 41 (see Figure 4).

As the cutting means is of the reciprocating knife type which has an effective drawing action in transversely slicing the cane into the desired short sections, it is therefore preferable to provide the conveyer with an intermittent motion so that during the cutting or slicing operation the presented cane is held stationary. The means for intermittently driving the shaft 41 will be pointed out subsequently in connection with the description of the operation of the cutting means.

Figure 8:
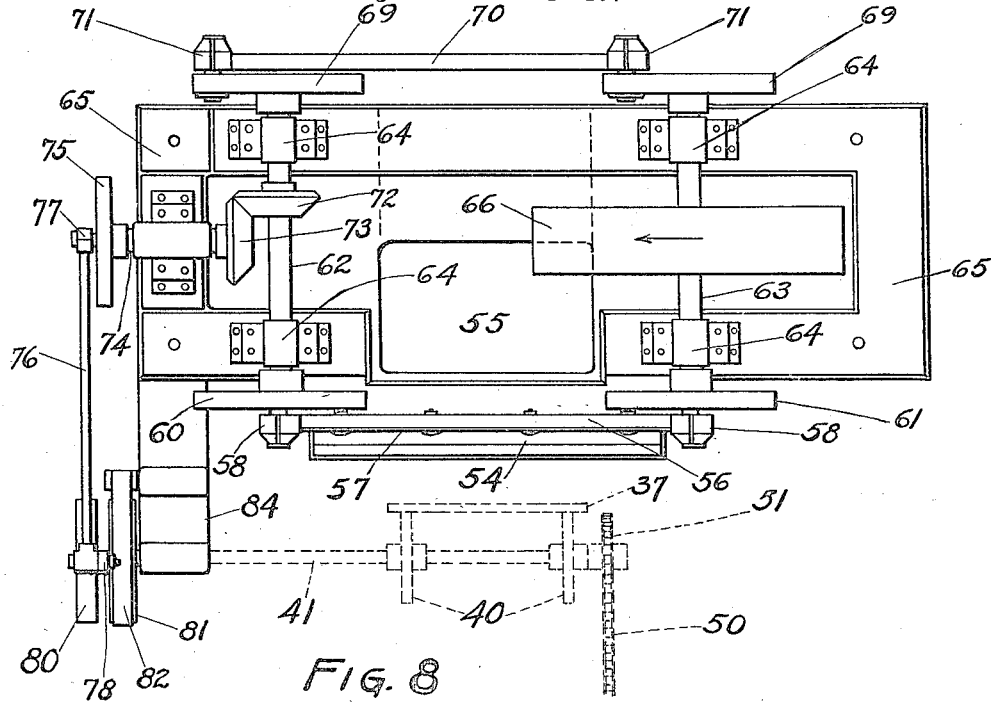
Figure 8 is a plan view of the cutting or sectioning mechanism.

A plurality of idler rollers 42 are rotatably journaled on brackets carried by the longitudinal support 43 of the conveyer frame. The two endless chains 36 move over the surfaces of these rollers which aid in supporting the load during the working travel of the apron. It is preferable to provide a supplemental member moving both adjacent to and in the same direction as the working apron. The purpose of this supplemental member or apron is to hold the cane firmly when it is approaching and also during the slicing operation. This supplemental apron is similar to the conveyer apron and consists of opposed chains 44 having bars 45 transversely secured thereto. These chains are mounted upon opposed sprockets 46 and 47 rotatably borne by the conveyer frame. The rear sprockets 47 are preferably keyed to a stud shaft 48 which has also fast thereon a sprocket 49 by means of which the supplemental apron is driven from the apron shaft 41 by means of a chain 50 driven by a sprocket 51 fast on the shaft 41 (see Figure 8). The chain 50 is engaged by the idlers 52 and 53, rotatably borne by the conveyer frame. By means of this drive, adjacent and opposed faces of the two aprons are driven in the same direction and at the same rate of speed. Likewise, as the apron is intermittently driven from the shaft 41, the supplemental apron will similarly be intermittently driven.

Figure 4:
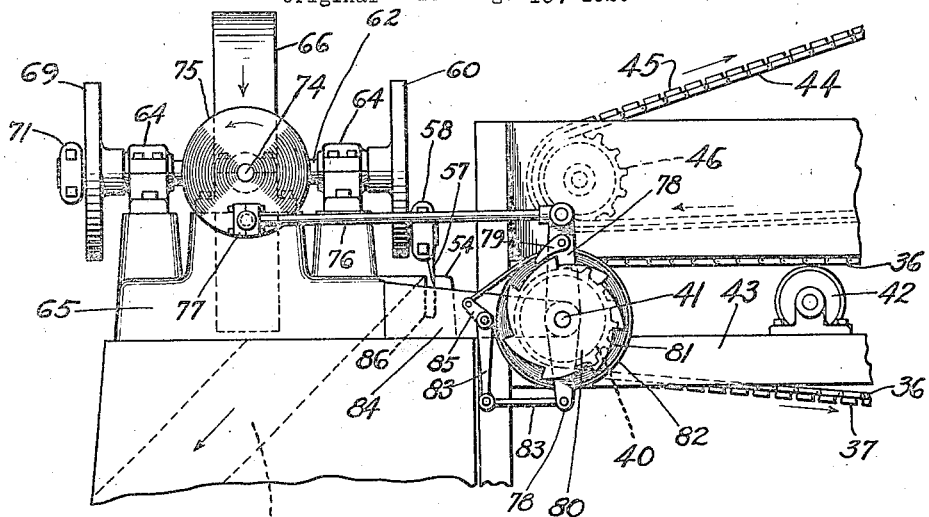
Figure 4 is a detailed view of the conveyor drive and stop-motion.
Figure 5:
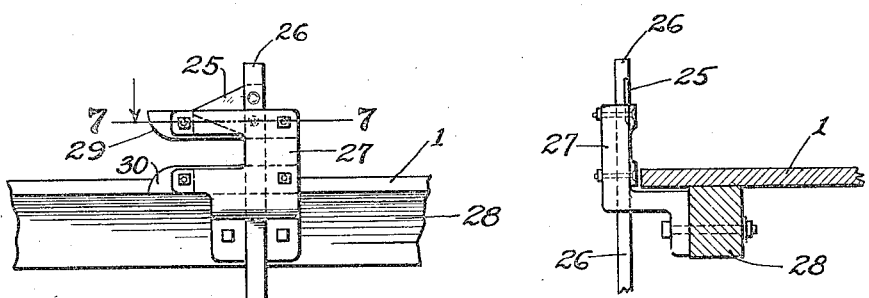
Figure 5 is a detail view in side elevation of one of the top-removing devices.
Figure 6:
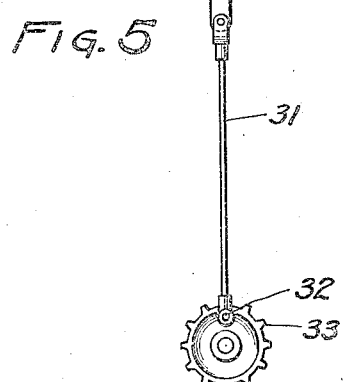
Figure 6 is a detail showing the bracket mounting of the movable knife of a top-removing device.
Figure 7:
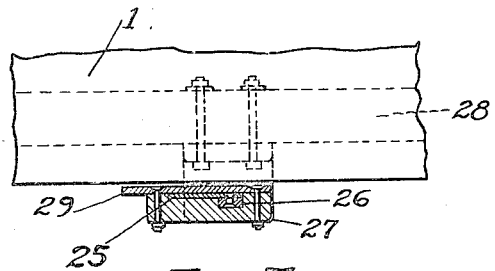
Figure 7 is a sectional view on the line 7—7 of Figure 5.

The means for cutting the presented cane into sections is located adjacent the forward terminus of the conveyer. A platform 54 extends transversely the front end of the conveyer and is adapted to receive the cane as discharged thereon by the conveyer. The central major portion of the foundation is cut away, as is shown in dotted lines in Figures 1 and 4, to form an upward continuation of a chute 55 provided through the preferably concrete foundation upon which is mounted the cutting means. This chute is adapted to receive the sectioned cane. The cutting element consists of an elongated knife bar 56 carrying a knife 57. The knife bar is terminally mounted in bearing boxes 58 pivotally carried on pins 59 eccentrically mounted on disks 60 and 61 keyed respectively to shafts 62 and 63. Both shafts are rotatably mounted in bearings 64 provided by the base of the cutting means. The shaft 63 has a pulley 66 keyed thereto which is actuated by a belt 67 by a pulley 68 on the line shaft 21. The cutting means is therefore driven from the line shaft. Upon the ends of the shafts 62 and 63 opposite to the disks 60 and 61 are keyed wheels 69. A connecting rod 70 has its terminals pivoted to bearing boxes 71 eccentrically mounted on the wheels 69. This connecting rod is preferably a quadrant in advance of the knife bar 56. A bevel gear 72 is keyed to the shaft 62 and meshes with the gear 73 carried by a stud shaft 74 journaled on the base 65. This shaft 74 has a disk 75 keyed thereon. A connecting rod 76 is borne at one end of a bearing box 77 eccentrically mounted on the disk 75 and its other end is pivoted to one end portion of a rocker arm 78 freely mounted on the shaft 41. A dog 79 is pivotally mounted on the upper portion of the rocker arm 78, as shown in Figure 4. The dog 79 is adapted to engage the teeth of a ratchet 80 which is fast on the shaft 41 whereby the shaft is given an intermittent rotation in one direction. The cane-presenting apron is thereby actuated by and in timed relation to the cutting mechanism through the shaft 41 as previously stated. In order that the momentum of the traveling apron may be arrested, a stop motion is employed. A drum 81 is keyed to the shaft 41 and is peripherally engaged by a brake band 82 of the external contracting type. The brake band 2 is alternately contracted upon the drum and released therefrom by means of pivotally joined links 83 pivotally borne at the lower end by the lower portion of the rocker arm 78 and at the upper end pivotally borne by a bracket 84 extending from the base 65. The upper link 83 carries a finger 85 to which one end of the brake band is secured, the other end of the brake band being secured to the stationary bracket 84.

In the position of the mechanism, in Figure 4, the knife has completed the cutting operation, at which time the connecting rod 76 has moved to the right both to release the brake band and to carry the dog 79 to the right to engage a ratchet tooth in order to rotate the ratchet in counter clockwise direction toward the completion of which motion the brake band will be tightened on its drum and movement of the shaft 41 arrested.

Figure 9:
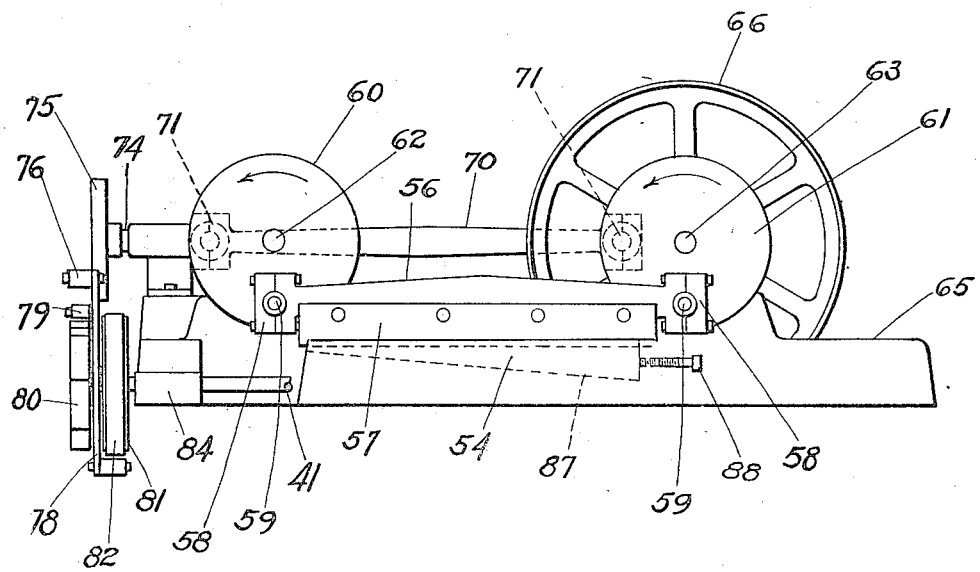
Figure 9 is a view in side elevation of the same.

A recess 86 extends transversely of the platform 54. A bar 87, preferably of steel, is seated in this recess and is longitudinally slotted to receive the knife edge. Preferably the recess 86 is inclined at its lower surface, as shown in dotted lines in Figure 9. The lower face of the bar is similarly inclined. This inclination of the bottom surface of the recess and bar permits of a wear-compensating adjustment of the bar 87 by means of the adjusting screw 88 received in threaded engagement in an aperture leading to the recess 86.

After sectioning by the knife, the cane drops by gravity down the chute 55 to an elongated upright chamber 90. Therein the cane is preferably raised by a suitably driven endless carrier of the bucket type. The cane as it is scooped up by the successive buckets is in relatively short sections. Not only are the valuable stalks so cut, but also are the leaves, trash, weeds, etc. The cane material may thus be elevated for subsequent delivery to other means for separating the stalks and the waste material, such, for example, as a screening and air blast device.

There is thus provided a simple and efficient apparatus for the topping of the cane, for the automatic conveyance of the topped cane and for its operatively timed presentation to the sectioning mechanism, whereat the cane material is cut into sections ready for the simple and facile separation of the stalks from the waste material.

Having thus described my invention what I claim as new and desire to secure by Letters-Patent is:

1. In an apparatus for preparing cane for extraction, the combination of a conveyer adapted to have the harvested cane transversely positioned thereon with the top portions arranged at one side thereof, opposed members positioned adjacent the side of the conveyer and adapted to receive the top portion of the cane therebetween, cutting means co-operable with said opposed members to sever the cane tops and means to actuate said conveyer and said cutting means.

2. In an apparatus for preparing cane for extraction, the combination of a conveyer adapted to have the harvested cane transversely positioned thereon with the top portions arranged at one side thereof, opposed members positioned adjacent the side of the conveyer and adapted to receive the top portion of the cane therebetween, cutting means co-operable with said opposed members to sever the cane tops, and means to actuate said conveyer and said cutting means in timed relation.

3. In an apparatus for preparing cane for extraction, the combination of a conveyer adapted to have the harvested cane transversely positioned thereon with the top portions arranged at one side thereof, a plurality of cutting means positioned in rearwardly spaced relation at one side of the conveyer whereby the conveyer successively presents the cane to the cutting means so that a subsequent cutting means may sever any tops remaining on the cane after the passage beyond the first cutting means.

4. In an apparatus for preparing cane for extraction, the combination of a conveyer adapted to have the harvested cane transversely positioned thereon with the top portions arranged at one side thereof, a plurality of cutting means positioned in rearwardly spaced relation at one side of the conveyer, the successive cutting means being transversely offset, whereby the conveyer presents the cane to the first cutting means and the cane tops may be thereby severed from the stalks and any unsevered cane may be manually moved transversely during conveyance to a subsequent offset cutting means and thereby severed.

5. In an apparatus for preparing cane for extraction, the combination of means automatically to remove the tops from the harvested cane, a conveyer adapted automatically to receive and convey the topped cane therefrom, cutting means to cut the conveyed cane into sections, and means for actuating said cutting means and conveyer in timed relation.

6. In an apparatus for preparing cane for extraction, the combination of means automatically to remove the tops from the harvested cane, a conveyer adapted automatically to receive and convey the topped cane therefrom, reciprocating cutting means to cut the conveyed cane into sections, and means for actuating said cutting means, and means for intermittently actuating said conveyer in timed relation to said reciprocating cutting means whereby the conveyer is not actuated during the cutting operation.

7. In an apparatus for preparing cane for extraction, the combination of a conveyer to receive and convey cane, reciprocating cutting means to cut the conveyed cane into sections, means to actuate the cutting means, means intermittently to actuate said conveyer in timed relation to the reciprocating cutting means whereby the conveyer is not actuated during the cutting operation, and a brake to hold the conveyor from movement in either direction during the cutting operation.

8. In an apparatus for preparing cane for extraction, the combination of a conveyer to receive and convey the cane, reciprocating cutting means to cut the conveyed cane into sections, means to actuate the cutting means, means intermittently to actuate said conveyer in timed relation to the reciprocating cutting means whereby the conveyer is not actuated during the cutting operation, and a stop-motion to arrest the conveyer during the cutting operation.

9. In an apparatus for preparing cane for extraction, the combination of a conveyer to receive and convey cane, reciprocating cutting means to cut the conveyed cane into sections, means to actuate the cutting means, a ratchet adapted to actuate said conveyer, a reciprocally driven dog adapted intermittently to rotate the ratchet in timed relation to the cutting means whereby the conveyer is not actuated during the cutting operation, and a brake to hold the conveyor from movement in either direction during the cutting operation.

10. In an apparatus for preparing cane for extraction, the combination of a conveyer to receive and convey cane, reciprocating cutting means to cut the conveyed cane into sections, means to actuate the cutting means, a ratchet adapted to actuate said conveyer, a reciprocally driven dog adapted intermittently to rotate the ratchet in timed relation to the cutting means whereby the conveyer is not actuated during the cutting operation, and a stop-motion cooperable with said reciprocally driven dog to arrest the conveyer during the cutting operation.

11. In an apparatus for preparing cane for extraction, the combination of a conveyer to receive and convey cane, reciprocating cutting means to cut the conveyed cane into sections, means to actuate the cutting means, a ratchet adapted to actuate the conveyer, a dog driven by said cutting means and adapted intermittently to rotate the ratchet in timed relation to the cutting means whereby the conveyer is not actuated during the cutting operation, a brake-drum to arrest conveyer movement, and a brake-band co-operable with said dog to arrest conveyer movement during the cutting operation.

12. In an apparatus for preparing cane for extraction, the combination of a conveyer to receive and convey cane, cutting means to cut the conveyed cane into sections, means for actuating the cutting means, a supplemental member co-operable with said conveyer to hold the cane when presented to the cutting means by the conveyer, and means to hold the conveyor from movement in either direction during the cutting operation.

13. In an apparatus for preparing cane for extraction, the combination of a conveyer to receive and convey cane, cutting means to cut the conveyed cane into sections, means for actuating the cutting means, a supplemental member co-operable with said conveyer to hold the cane on said conveyer when the cane is approaching and during the cutting operation, means for actuating said supplemental member in timed relation to the conveyer, and means to hold the conveyor from movement in either direction during the cutting operation.

14. In an apparatus for preparing cane for extraction, the combination of a conveyer to receive and convey cane, cutting means to cut the conveyed cane into sections, means for actuating the cutting means, a supplemental member co-operable with said conveyer to hold the cane on said conveyer when the cane is approaching and during the cutting operation, means intermittently to actuate said conveyer and said supplemental member in timed relation to the cutting means whereby said conveyer and said member are not actuated during the cutting operation, and means to hold the conveyor from movement in either direction during the cutting operation.

In witness whereof, I have hereunto set my hand this 13th day of February, 1922.

EDWARD WESSALE.